United States Patent
Srinivasa (10) Patent No.: US 7,164,808 B2
(45) Date of Patent: Jan. 16, 2007

(54) METHOD AND APPARATUS FOR ILLUMINATION COMPENSATION OF DIGITAL IMAGES

(75) Inventor: Narayan Srinivasa, Moorpark, CA (US)

(73) Assignee: HRL Laboratories, LLC, Malibu, CA (US)

( * ) Notice: Subject to any disclaimer, the term of this patent is extended or adjusted under 35 U.S.C. 154(b) by 832 days.

(21) Appl. No.: 10/356,155

(22) Filed: Jan. 30, 2003

(65) Prior Publication Data

US 2004/0042676 A1    Mar. 4, 2004

Related U.S. Application Data

(60) Provisional application No. 60/406,462, filed on Aug. 27, 2002.

(51) Int. Cl.
    G06K 9/40    (2006.01)
    G06K 9/36    (2006.01)

(52) U.S. Cl. ...................................... 382/274
(58) Field of Classification Search ................. 382/274
    See application file for complete search history.

(56) References Cited

U.S. PATENT DOCUMENTS

| 6,078,686 | A * | 6/2000 | Kim ............................ 382/167 |
| 6,782,137 | B1 * | 8/2004 | Avinash ....................... 382/254 |
| 2003/0072496 | A1 * | 4/2003 | Woodell et al. ............. 382/260 |

OTHER PUBLICATIONS

Hadhoud; "Image contrast enhancement using homomorphic processing and adaptive Filters", 16th National Radio Science Conference, NRSC '99, Feb. 23-25, 1999.*

Deng et al.; "The Study of Logarithmic Image Processing Model and Its Application to Image Enhancement", IEEE, 1995.*

Cohen, M., et al., "Neural dynamics of brightness perception: Features, boundaries, diffusion, and resonance," *Perception & Psychophysics*, vol. 36, No. 5, pp. 428-456 (1984).

Grossberg, S., et al., "A Neural Network Architecture for Preattentive Vision," *IEEE Transactions on Biomedical Engineering*, vol. 36, No. 1, pp. 65-84 (Jan. 1989).

Grossberg, S., et al, "Neural Dynamics of 1-D and 2-D Brightness Perception: A Unified Model of Classical and Recent Phenomena," *Perception & Psychophysics*, vol. 43, pp. 241-277 (1988).

Hummel, R., "Image Enhancement by Histogram Transformation," *Computer Graphics and Image Processing* 6, pp. 184-195 (1977).

Jain, A.K., *Fundamentals of Digital Image Processing*, Prentice Hall, Englewood Cliffs, NJ, pp. 241-244 (1989).

Mukherjee, D., et al., "Adaptive Neighborhood Extended Contrast Enhancement and Its Modifications," *Graphical Models and Image Processing*, vol. 57, No. 3, pp. 254-265 (May 1995).

Narendra, P.M., et al., "Real-Time Adaptive Contrast Enhancement," *IEEE Transactions on Pattern Analysis and Machine Intelligence*, vol. PAMI-3, No. 6, pp. 655-661 (Nov. 1981).

(Continued)

*Primary Examiner*—Joseph Mancuso
*Assistant Examiner*—Jordan Kuhn
(74) *Attorney, Agent, or Firm*—Ladas & Parry LLP (57) ABSTRACT

A method for enhancing the quality of a digital image by using a single user-defined parameter. A virtual image is created based on the single user-defined parameter and the original digital image. An adaptive contrast enhancement algorithm operates on a logarithmically compressed version of the virtual image to produce adaptive contrast values for each pixel in the virtual image. A dynamic range adjustment algorithm is used to generate logarithmic enhanced pixels based on the adaptive contrast values and the pixels of the logarithmically compressed version of the virtual image. The logarithmic enhanced pixels are exponentially expanded and scaled to produce a compensated digital image.

27 Claims, 6 Drawing Sheets

OTHER PUBLICATIONS

Oppenheim, A.V., et al., "Nonlinear Filtering of Multiplied and Convolved Signals," *Proceedings of the IEEE*, pp. 1264-1291 (Aug. 1968).

Paranjape, R.B., et al., "Adaptive-Neighborhood Histogram Equalization for Image Enhancement," *CVGIP: Graphical Models and Image Processing*, vol. 54, No. 3, pp. 259-267 (May 1992).

Pizer, S.M., et al., "Adaptive Histogram Equalization and Its Variations," *Computer Vision, Graphics, and Image Processing*, vol. 39, pp. 355-368 (1987).

Schutte, K., "Multi-Scale Adaptive Gain Control of IR Images," *SPIE*, vol. 3061, pp. 906-914.

Stark, J.A., "Adaptive Image Contrast Enhancement Using Generalizaztions of Histogram Equalization," *IEEE Transaction on Image Processing*, vol. 9, No. 5, pp. 889-896 (May 2000).

Toet, A., "Adaptive Multi-Scale Contrast Enhancement Through Non-Linear Pyramid Recombination," *Pattern Regognition Letters*, vol. 11, No. 11, pp. 735-742 (Nov. 1990).

* cited by examiner

METHOD AND APPARATUS FOR ILLUMINATION COMPENSATION OF DIGITAL IMAGES

CLAIM OF BENEFIT OF PROVISIONAL APPLICATION

This application claims the benefit of U.S. Provisional application Ser. No. 60/406,462, filed on Aug. 27, 2002, which is incorporated herein by reference in its entirety.

BACKGROUND

1. Field

The present invention relates to illumination compensation in digital images. More particularly, the present invention relates to balancing the dynamic range of a scene within a digital image with contrast enhancement of the scene.

2. Description of Related Art

Image enhancement refers to the science of improving the quality of an image based on some absolute measure. While the problems with image quality are numerous, such as focus problems, depth-of-field issues, motion blur, dynamic range of scene and other sources of noise, the main focus in the digital image processing community has been to improve or enhance fine structure contrasts. This is primarily referred to as contrast enhancement. Contrast enhancement is useful when image contrasts are imperceptible or barely perceptible. Low contrast can be caused by scenes that are hazy or have other poor illumination conditions. This problem is further exacerbated by the fact that cameras with low dynamic range capture the scene with a reduction in dynamic range from the true range present in the scene and this comes with the penalty of further loss of contrast. However, there is experimental evidence that suggests that human perception (subjective quality) is the best when the image's contrast and dynamic range is high. This is the primary motivation for developing a new method for image enhancement.

Contrast enhancement techniques for images are broadly classified into two classes. The first class modifies the intensity histogram of images for contrast enhancement. A special case is the histogram equalization method. See, for example, Anil K. Jain, *Fundamentals of Digital Image Processing*, Prentice Hall, 1969, pp. 241–244. Histogram equalization applied to an entire image has the disadvantage of attenuating or even removing contrast information of small magnitudes in the scarcely populated histogram regions. This is because neighboring pixels in such regions are mapped to the same output histogram value.

Another method using histogram modification is adaptive histogram equalization. Adaptive histogram equalization applies histogram modification based on local statistics of an image rather than on a global scale. See, for example, R. A. Hummel, "Image Enhancement By Histogram Transformation," *Computer Vision Graphics and Image Processing*, vol. 6, 1977, pp. 184–195; R. B. Paranjape, W. M. Morrow and R. M. Rangayyan, "Adaptive-Neighborhood Histogram Equalization For Image Enhancement," *Computer Vision Graphics and Image Processing*, vol. 54, no. 3, 1992, pp. 259–267; and, D. Mukherjee and B. Chatterji, "Adaptive Neighborhood Extended Contrast Enhancement And Its Modifications," *Graphical Models and Image Processing*, vol. 57, no. 3, 1995, pp. 254–265. Contrast enhancement methods based on adaptive histogram equalization are generally computationally slow. Since such methods operate on purely local statistics, the methods sometimes create artifacts that make it hard to distinguish real objects from clutter. There are other variations of adaptive histogram techniques that address the trade-off issues between computational speed and accuracy of enhancement. See, for example, S. M. Pizer, et. al, "Adaptive Histogram Equalization And Its Variations," *Computer Vision Graphics and Image Processing*, vol. 39, 1987. pp. 355–368. J. Alex Stark in "Adaptive Image Contrast Enhancement Using Generalizations Of Histograms," *IEEE Transactions on Image Processing*, vol. 9, no. 5, May 2000, describes a generalized histogram representation with a goal of reducing the number of parameters to adjust and yet obtain a wide variety of contrast enhancement results.

A second class of contrast enhancement techniques operate directly on the image by applying the principle of separating high and low frequency content in the image. In these cases the image histogram is not adjusted. The frequency contents are instead manipulated and filtered in such a way as to enhance the image contrast. Two examples of this approach are the homomorphic filtering method and the unsharp masking approach. The homomorphic filtering method is described in more detail by A. V. Oppenheim, R. W. Schafer and T. G. Stockham Jr., in "Nonlinear Filtering Of Multiplied And Convolved Signals," *Proc. of IEEE*, vol. 56, no. 8, 1968, pp. 1264–1291.

More recent variations of techniques based on the separation of high and low frequency content operate directly on the image based on purely local statistics. See, for example, P. M. Narendra and R. C. Fitch, "Real-Time Adaptive Contrast Enhancement," *IEEE Trans. On Pattern Analysis and Machine Intelligence*, vol. 3, no. 6, 1981, pp. 655–661. The local statistics of the image are characterized by the mean and variance in intensity. The mean represents the low frequency content while the variance represents the high frequency content in the image. An adaptive scheme based on these two parameters is used to manipulate the image content so as to enhance contrast in the image. These approaches have also been extended using a multi-scale algorithm as described in A. Toet, "Adaptive Multi-Scale Contrast Enhancement Through Non-Linear Pyramid Recombination," *Pattern Recognition Letters*, vol. 11, 1990, pp. 735–742, and K. Schutte, "Multi-Scale Adaptive Gain Control Of IR Images," *Proc. of SPIE*, vol. 3661, 1997, pp. 906–914. A similar approach is the ON-OFF filter that was designed as a set of two parallel modules that measures local statistics using the differences of a Gaussian filter. See, for example, S. Grossberg and D. Todorovic, "Neural Dynamics Of 1-D And 2-D Brightness Perception: A Unified Model Of Classical And Recent Phenomena," *Perception and Psychophysics*, vol. 43, 1988, pp. 241–277. In this approach, contrast enhancement is realized by combining the outputs of the two modules to improve robustness. The OFF module performs an image inversion on the input image before extracting contrast information.

Prior art methods for contrast enhancement are typically deficient either in the quality of image enhancement due to inherent problems with the method or are computationally slow and require image-specific adjustments of several system parameters. As discussed above, prior art methods based on modification of the intensity histogram of images have the disadvantage of attenuating or even removing contrast information of small magnitudes in the scarcely populated histogram regions. This result occurs because neighboring pixels in such regions are mapped to the same output histogram value. Methods based on adaptive histogram modification attempt to address this problem, but these methods are computationally slow. As also discussed above, other prior art methods operate directly on the image by applying the principle of separating high and low frequency content in the image. In these methods, the image histogram is typically not adjusted. The frequency contents are instead manipulated and filtered in such a way as to enhance the image contrast. These methods are also generally computationally slow and require image specific adjustments to several parameters for improved results. Further, while the contrast enhancement is improved in most cases, the dynamic range of the image is not.

Therefore, there exists a need in the art for enhancing the contrast of a digital image without attenuating or removing contrast information in portions of the image and without requiring significant computation times. There also exists a need in the art for performing such contrast enhancement without requiring image specific adjustments to several parameters to obtain satisfactory results. Finally, there exists a need in the art for controlling dynamic range while contrast enhancement is being performed.

SUMMARY

Embodiments of the present invention provide a method and apparatus for balancing the dynamic range and contrast content in an image such that the overall quality of the image is enhanced by adjusting only a single user-defined parameter. Embodiments of the present invention provide contrast enhancement without requiring image specific adjustments to several parameters for improved results. Embodiments of the present invention provide the desired illumination compensation in a computationally efficient manner.

An embodiment of the present invention provides a method for enhancing the quality of a digital image by using a single user-defined parameter. A virtual image is created based on the single user-defined parameter and the original digital image. An adaptive contrast enhancement algorithm operates on a logarithmically compressed version of the virtual image to produce adaptive contrast values for each pixel in the virtual image. A dynamic range adjustment algorithm is used to generate logarithmic enhanced pixels based on the adaptive contrast values and the pixels of the logarithmically compressed version of the virtual image. The logarithmic enhanced pixels are exponentially expanded and scaled to produce a compensated digital image.

Embodiments of the present invention provide image enhancement that can concurrently balance the dynamic range in a scene with the contrast in the scene. A virtual image of the scene is generated to facilitate dynamic range compensation. The virtual image is generated to simulate the dynamic range that would be captured from a scene as if the scene were viewed by a virtual camera of wider dynamic range. An adaptive contrast enhancement algorithm operates on the local image statistics measured at each pixel. Using the virtual image in combination with the adaptive contrast enhancement algorithm, embodiments of the present invention are able to compensate for illumination for a wide range of illumination conditions. The embodiments are computationally efficient and the quality of the output produced by the various embodiments may be controlled using a single user-defined parameter.

An embodiment of the present invention comprises a method for image enhancement having the steps of: receiving a digital image of a scene, the digital image comprising a plurality of digital image pixels; generating a virtual image of at least a portion of the digital image pixels, the virtual image having a plurality of virtual pixels, each virtual pixel having a pixel intensity; logarithmically converting the pixel intensities of at least a portion of the virtual pixels to produce a plurality of log virtual pixels; performing adaptive contrast enhancement on at least a portion of the log virtual pixels to produce a plurality of adaptive contrast values corresponding to said at least a portion of log virtual pixels; performing dynamic range adjustment using said at least a portion of the log virtual pixels and said plurality of adaptive contrast values to produce a plurality of log enhanced pixels; and exponentially converting at least a portion of the log enhanced pixels to produce a plurality of enhanced pixels, the plurality of enhanced pixels comprising an enhanced digital image.

Another embodiment of the present invention comprises an apparatus for producing an enhanced image from a digital image having a plurality of digital image pixels, the apparatus comprising: means for expanding a dynamic range of at least a portion of the digital image pixels to produce a virtual image comprising a plurality of virtual pixels; means for calculating a corresponding adaptive contrast value for a corresponding virtual pixel of the plurality of virtual pixels, said means for calculating receiving said plurality of virtual pixels and producing a plurality of adaptive contrast values; means for adjusting an intensity of a corresponding virtual pixel of said plurality of virtual pixels, said means for adjusting receiving said plurality of adaptive contrast values and said plurality of virtual pixels and producing a plurality of enhanced pixels; and, means for scaling said plurality of enhanced pixels to produce said enhanced image.

Still another embodiment of the present invention comprises a method for enhancing the contrast of a digital image wherein said digital image comprises an array of digital pixels, each digital pixel having a dynamic range, said method having the steps of: specifying a virtual camera parameter; generating an array of virtual pixels from said array of digital pixels, each virtual pixel having an expanded dynamic range based on said virtual camera parameter; logarithmically converting said array of virtual pixels to an array of log virtual pixels; generating an array of adaptive contrast values corresponding to said array of log virtual pixels; generating an array of log enhanced pixels from said log virtual pixels and from said array of adaptive contrast values; exponentially converting said array of log enhanced pixels to an array of enhanced pixels, each enhanced pixel having an intensity; and scaling the intensity of each enhanced pixel to be within a specified range for an image output device.

Still another embodiment of the present invention provides a method of creating a virtual image of a digital image, the virtual image having a higher dynamic range than the digital image, the digital image and the virtual image comprising a plurality of pixels, and the method comprising the steps of: specifying a virtual camera parameter; determining a pixel intensity for each pixel in the digital image; and calculating a pixel intensity for each pixel in the virtual image based on the virtual camera parameter and the pixel intensity for each pixel in the digital image.

Embodiments of the present invention are not limited to hardware only, software only, or firmware only implementations. Those skilled in the art will understand that embodiments of the present invention may be implemented using a variety of software, hardware, and/or firmware technologies known in the art.

DETAILED DESCRIPTION OF PREFERRED EMBODIMENTS

The present invention now will be described more fully hereinafter with reference to the accompanying drawings, in which preferred embodiments of the invention are shown. This invention may be embodied in many different forms and should not be construed as limited to the embodiments set forth herein.

A typical device used to view and capture a scene is a Charge Coupled Device (CCD) camera array. During the image capturing process, the variations in the scene's illumination is transformed into a set of luminance values on the CCD camera array. When the scene illumination is not uniform (such as in a sunlit landscape), the dynamic range (i.e., the ratio of maximum luminance in the scene to the minimum luminance) can be on the order of 2000. Typically, a CCD camera has a dynamic range between 16 and 32. Thus, a CCD camera may not capture the true range of illumination variations found in the sunlit scene, for example. The images captured by the CCD camera are instead compressed in their dynamic range. In particular, this loss of information due to dynamic range compression leads to loss of contrast information. In other words, contrast is attenuated wherein barely noticeable contrast becomes unnoticeable. This phenomenon can be observed using a simple mathematical model as described below.

Let the scene image be represented by $I_{SCENE}$ and the corresponding image by the CCD camera be represented by $I_{CCD}$. Then the dynamic range transformation from $I_{SCENE}$ to $I_{CCD}$ can be modeled using the point transfer function as:

$$I_{CCD} = K I_{SCENE}^\gamma \quad \text{(Eq. 1)}$$

where $\gamma$ is the dynamic range constant while K is a constant scaling factor. The $\gamma$ controls the degree of dynamic range compression (if $\gamma<1.0$) or expansion (if $\gamma>1.0$). For most regular CCD cameras with reduced dynamic range, $\gamma$ is less than 1.0. Using Equation 1, for small changes in the scene illumination $\delta I_{SCENE}$, the corresponding change in the CCD image $\delta I_{CCD}$ can be written as:

$$\frac{\delta I_{CCD}}{I_{CCD}} = \gamma \frac{\delta I_{SCENE}}{I_{SCENE}} \quad \text{(Eq. 2)}$$

where the two ratios on the left and right side of Equation 2 represent contrast information for the CCD and the scene images, respectively. Equation 2 suggests that the contrast in the CCD image is scaled by the $\gamma$ parameter but is independent of intensity of illumination. Thus, for $\gamma<1$, as is observed in most CCD cameras, the contrast information registered by the CCD camera for any scene image is attenuated and furthermore is scaled down uniformly irrespective of the ambient illumination conditions (i.e., in bright or dark areas of the image).

Figure 1:
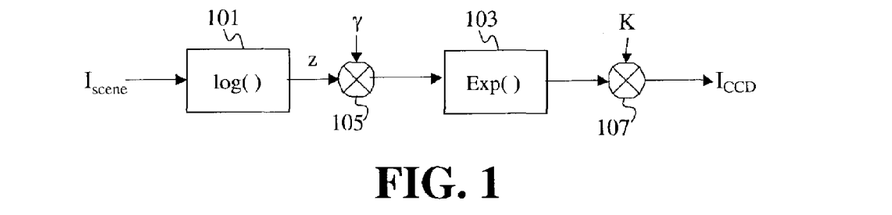
FIG. 1 shows a block diagram for modeling the transformation of a viewed scene to an image as captured by an imaging device.

One common approach to model the image registration process described above is based on the block diagram as shown in FIG. 1. The scene image $I_{SCENE}$ is first converted by a logarithmic operator 101 into a log image using an intermediate variable z. A multiplier 105 multiplies the log image z by $\gamma$. An exponential operator 103 computes the exponent of the $\gamma$ times z product. A multiplier 107 then multiplies the resultant by the constant K to complete the transformation of $I_{SCENE}$ into $I_{CCD}$.

Embodiments of the present invention essentially involve the modification of the portion of the block diagram shown in FIG. 1 before the exponential operator 103 to provide for simultaneous adjustment of the dynamic range and the contrast in an image. Embodiments of the present invention comprise three main modules: an adaptive contrast enhancing module, a dynamic range module, and a virtual image generation module. Preferably, the adaptive contrast enhancing module and the dynamic range module work in tandem to simultaneously enhance the overall image. The virtual image generation module is used since the true image $I_{SCENE}$ is unknown, and only the acquired image $I_{CCD}$, with a limited dynamic range, is available for processing. The virtual image generation module helps to address this problem by creating a virtual image of high dynamic range.

Embodiments of the present invention are described below. First, the details of a preferred embodiment of the adaptive contrast enhancement module are presented. Second, a description of a preferred embodiment of the dynamic range module is presented. Third, a preferred embodiment of the virtual image generation module is presented. Fourth, embodiments of a system comprising the three modules are discussed, where the parameters of the system may be adjusted at both a pixel level as well as a global level by defining a single user parameter that enables the automatic setting of all other system parameters. Fifth, software and hardware implementations of the present invention are discussed. Finally, results of image enhancement according to the present invention will be presented.

Adaptive Contrast Enhancement

The adaptive contrast enhancement module operates on the local image statistics measured at each pixel (i,j) of the log image z(i,j) as follows. The log image representation has a useful property in that the local difference $\delta z(i,j)$ is directly equal to the contrast in the input image $I_{SCENE}$ at pixel (i,j). The local contrast at any given pixel is measured as the difference between z(i,j) and $z_{mean}$(i,j). The mean intensity, $z_{mean}$(i,j), represents the mean intensity in the log domain within the local neighborhood of the pixel. In a preferred embodiment of the present invention, the local neighborhood is defined by using a 3 pixel by 3 pixel window. Other size windows may be used, but a 3×3 window is preferred, since it provides for computational efficiency and provides for the sharpest contrast. The advantages of the locality property will also generally decrease with larger size windows.

Adaptive contrast enhancement is described by P. M. Narenda and R. C. Fitch in "Real-time Adaptive Contrast Enhancement," *IEEE Trans. on Pattern Analysis and Machine Intelligence,* vol. PAMI-3, no. 6, November 1981, pp. 655–661. It is also described by M. A. Cohen and S. Grossberg in "Neural Dynamics Of Brightness Perception: Features, Boundaries, Diffusion And Resonance," *Perception and Psychophysics,* vol. 41, 1987, pp. 117–158. Typically, in these previous efforts and others known in the art, the local contrast is scaled by a constant factor and then combined with the scaled image from a dynamic range module. However, such a procedure does not discriminate between small and large contrast regions. As a result, the choice of the scaling factor has to balance the prevention of large contrasts from saturating the image while at the same time prevent small contrast regions from becoming imperceptible. Thus, according to these prior art procedures, image specific tuning of the scaling factor is generally required to avoid saturating the image while still allowing small contrast regions to be seen.

According to embodiments of the present invention, instead of allowing a single scale factor to control the contrast content, an adaptive scale parameter π(i,j) for each pixel is generated. The value of this parameter is defined as:

$$\pi(i, j) = \frac{[v(i, j) - C]^+}{v(i, j)} \quad \text{(Eq. 3)}$$

where v(i,j) is the variance of intensity at pixel (i,j) and C is a constant. The function $[x]^+ = \max(x,0)$ represents a rectification of input x.

In Equation 3, the variance v(i,j) is computed as $(I(i,j) - M(i,j))^2$ where I(i,j) is the intensity at pixel (i,j) and M(i,j) is the mean intensity of pixels within the local neighborhood centered at pixel (i,j). In Equation 3, the constant C must be greater than zero and should be small (C<0.001). In a preferred embodiment of the present invention, a value of 0.0005 is used for C. Typically, a small constant C ensures that the rectification in the numerator of Equation 3 will be greater than zero and thus makes the adaptive scale parameter π(i,j) effective.

The adaptive scale parameter π(i,j) operates as follows. When the observed intensity z(i,j) at a given pixel is larger than the mean $z_{mean}$(i,j) then the observed intensity at that pixel corresponds to a large contrast region. A large contrast region provides that the variance v(i,j) at that pixel is large. Using the adaptive scale parameter, a new adaptive local mean $az_{mean}$(i,j) is defined as:

$$az_{mean}(i,j) = (1 - \pi(i,j)) z_{mean}(i,j) + \pi(i,j) z(i,j) \quad \text{(Eq. 4)}$$

where the adaptive mean is derived as weighted sum between the actual mean $z_{mean}$(i,j) and the input signal z(i,j). Finally, the adaptive contrast aδz(i,j) at a pixel is computed as follows:

$$a\delta z(i,j) = z(i,j) - az_{mean}(i,j) \quad \text{(Eq. 5)}$$

Equation 4 above is similar to Equation (1) in Narenda and Fitch, discussed above. However, the algorithm disclosed by Narenda and Fitch directly operates on the input image, while embodiments of the present invention generally operate on the log value of the image. Further, the weighting in embodiments of the present invention is adaptive while that described in Narenda and Fitch depends on a user defined constant. Narenda and Fitch disclose that this constant needs to be set manually on a per image basis, especially for high dynamic range images, so as to balance out large excursions in intensity. While embodiments of the present invention may rely on the setting of the constant C for the calculation of the adaptive scaling parameter (see Equation 3 above), this constant does not have to be changed on a per image basis. Essentially, the setting of the constant C is more relaxed, since it is preferably small and is relatively insensitive to variations within that bound, irrespective of the type of image. Further, Narenda and Fitch do not disclose the balance between contrast enhancement and dynamic range content in an enhanced scene provided by embodiments of the present invention as is described below.

Using the weighted scheme described above, the adaptive contrast is adjusted as follows. From Equation 3, when the variance in intensity is high at a pixel, then the adaptive parameter π(i,j) is close to 1.0. From Equation 4, when the adaptive parameter π(i,j) is close to 1, the adaptive local mean $az_{mean}$(i,j) almost fully corresponds to the observed intensity z(i,j) at that pixel. From Equation 5, when the adaptive local mean is nearly equal to the observed intensity, the adaptive contrast aδz(i,j) at that pixel is close to 0. Therefore, high contrast regions in the input image cause minimal change to the adaptive contrast. Similarly, from Equation 3, if the variance at a pixel is close to 0, the adaptive parameter π(i,j) is close to 0. From equation 4, the adaptive parameter π(i,j) being close to 0 results in the adaptive local mean $az_{mean}$(i,j) almost fully corresponding to the actual mean intensity $z_{mean}$(i,j) at that pixel. Since the local contrast is defined as the difference between the intensity z(i,j) and the actual mean intensity $z_{mean}$(i,j), when the adaptive local mean is nearly equal to the actual mean intensity, Equation 5 provides that the adaptive contrast aδz(i,j) at that pixel is close to the actual contrast information. Therefore, low contrast regions in the input image will result in minimal loss of adaptive contrast. The adaptive approach described above provides the ability to strike a balance to preserve both large contrasts without saturating the image while at the same time enhance the small contrasts so as to make them perceptible.

Figure 2:
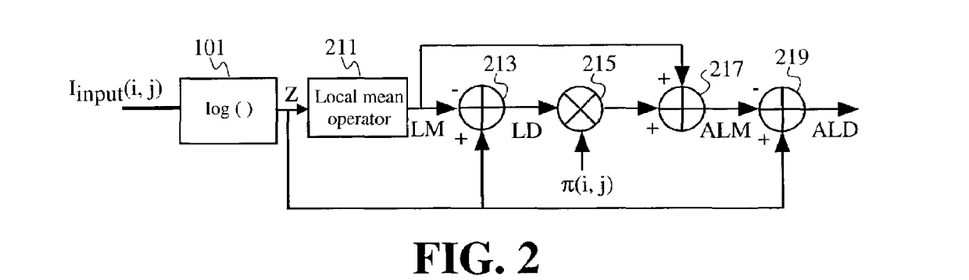
FIG. 2 shows a block diagram of an adaptive contrast enhancement process according to an embodiment of the present invention.

FIG. 2 shows a block diagram that implements the process of adaptive contrast computation described above. In FIG. 2, the scene image $I_{input}$ is converted by the logarithmic operator 101 into a log image using an intermediate variable z. A local mean operator 211 calculates the local mean intensity LM in the log domain within the local neighborhood of the pixel (i,j). As described above, a preferred local neighborhood is 3×3, but other sizes may be used. The local mean intensity LM is then subtracted from the log image z at a first subtractor 213 to provide a local difference value LD. The adaptive parameter π(i,j) is calculated as discussed above. A multiplier 215 then multiples the local difference value by the adaptive parameter, which is added to the local mean intensity by adder 217 to create an adaptive local mean ALM. A second subtractor 219 subtracts the log image z from the adaptive local mean to create an adaptive local difference ALD, also referred to as "contrast gain."

Dynamic Range Adjustment

Embodiments of the present invention also preferably comprise a dynamic range adjustment module. The dynamic range of an image (scene, camera image, etc.) can be defined as follows:

$$D = \frac{z_{max}}{z_{min}} \quad \text{(Eq. 6)}$$

where $z_{max}$ and $z_{min}$ correspond to maximum and minimum intensity found in the image. The local dynamic range for each pixel in the image may be considered as the ratio of the intensity of each pixel to the minimum intensity of the image. That is, the local dynamic range $D_i(i, j)$ at each pixel may be calculated as follows:

$$D_i(i, j) = \frac{I(i, j)}{z_{min}} \quad \text{(Eq. 7)}$$

where $I(i,j)$ represents the intensity of each pixel.

The dynamic range adjustment module of embodiments of the present invention essentially performs a scaling operation on the log image. The scaling operation may be represented as follows:

$$z_{adj}(i,j) = z(i,j) * \gamma_D \quad \text{(Eq. 8)}$$

where $\gamma_D$ is the dynamic range scale factor. This operation ensures that $z_{max}$ and $z_{min}$ are separated further apart so that D is high.

The scale factor $\gamma_D$ is, however, adjusted such that it forms a convex sum (see Equation 10 below) with the scale factor $\gamma_C$ used for the adaptive contrast enhancement discussed above. The convex sum ensures that the overall effect on the compensated image is balanced as a compromise between the dynamic range component and the contrast component. The value for the constant factor in Equation 10 decides the overall magnitude of the compensation. In a preferred embodiment of the present invention, the constant factor is 1.0. The overall effect of the adaptive contrast enhancement module and the dynamic range adjustment module is that a modified log image $z_{mod}$ is obtained that can be represented as:

$$z_{mod}(i,j) = a\delta z(i,j) * \gamma_C + z(i,j) * \gamma_D \quad \text{(Eq. 9)}$$

where:

$$\gamma_C + \gamma_D = \text{const.} \quad \text{(Eq. 10)}$$

In preferred embodiments of the present invention, the values for the two scale factors, $\gamma_C$ and $\gamma_D$, will be chosen based on a user defined input as is described below.

Virtual Image Generation

Finally, preferred embodiments of the present invention also comprise a virtual image generation module. A virtual image generation module provides improved performance for the following reasons. In the adaptive contrast enhancement modules and dynamic range adjustment modules, it is assumed that the true image $I_{SCENE}$ with its inherent high dynamic range is known. However, $I_{SCENE}$ is unknown. Instead, what is available is an image $I_{input}$ that has already been captured by an imaging device, such as a CCD camera. The captured image $I_{input}$ will necessarily have a lower dynamic range than the true image $I_{SCENE}$. The virtual image generation module helps to address this problem by creating a virtual image of high dynamic range.

In order to create a virtual image, a parameter is used that defines the "desired" dynamic range for the virtual camera image. This parameter may be a user-defined parameter. The virtual camera parameter B represents the bits/pixel for the virtual camera. The higher the bits/pixel, the greater the dynamic range is for the virtual camera image. Once the virtual camera parameter B is defined, then the maximum intensity that the virtual camera can register can be computed as $2^B$.

As shown above in Equation 7, the dynamic range $D_i(i,j)$ for the pixels within the actual camera image can be calculated based upon the minimum intensity $z_{min}$ within the image. Alternatively, as described immediately above, the dynamic range $D_i(i,j)$ can be calculated based upon the maximum possible intensity of the actual camera image. That is, if the actual camera image is acquired with a camera having an intensity resolution of X bits/pixel, the maximum possible intensity for a pixel is $2^X$. The dynamic range for any given pixel in the input image may then be calculated as follows:

$$D_i(i, j) = \frac{2^x}{I_{input}(i, j)} \quad \text{(Eq. 11)}$$

The minimal intensity for the virtual camera image will occur at the same pixel that has the minimal intensity in the input image. At that pixel, the ratio of the dynamic range for the virtual image $D_v(i,j)$ to the dynamic range for the input image $D_i(i,j)$ is $2^{(B-X)}$, where B and X are as defined above. Using this ratio, a transformation model from the dynamic range for the input image to the dynamic range of the virtual image is defined as follows:

$$D_v(i, j) = D_i(i, j)^{RD}, \quad \text{if } B > X \quad \text{(Eq. 12)}$$
$$= D_i(i, j), \quad \text{if } B = X$$
$$\text{where } R = \frac{X}{B} \text{ and } D = B - X$$

Standard imaging devices, such as CCD cameras, typically provide a bits/pixel value of 8, so X in Equation 12 is typically 8.

The dynamic range of the virtual image $D_v(i,j)$ may also be defined in the same manner as the dynamic range for the input image $D_i(i,j)$ shown by Equation 11. That is, $$D_v(i, j) = \frac{2^x}{I_{virtual}(i, j)} \quad \text{(Eq. 13)}$$

The pixel-wise intensities for the virtual image $I_{virtual}(i,j)$ can then be found for Equations 11, 12, and 13 as follows:

$$I_{virtual}(i,j) = 2^{(B-XRD)} I_{input}(i,j)^{RD} \quad \text{Eq. (14)}$$

or, alternatively, $$I_{virtual}(i, j) = 2^{(B-X(B-X)\frac{X}{B})} I_{input}(i, j)^{\frac{X}{B}(B-X)}$$ Eq. (15)

As defined, the computation for the intensities of the pixels of the virtual image make use of the single virtual camera parameter B, which, as indicated above, may be user defined, and the intensity resolution X of the input image. While $I_{virtual}(i,j)$ cannot be visualized as a standard image (because of higher bits/pixel), it provides an image with a higher dynamic range compared to $I_{input}$ (the actual camera image) described in the previous sections, since, as described above, the dynamic range of $I_{input}$ is limited to the dynamic range of the actual camera that captured the image. In preferred embodiments of the present invention, all the computations described in the previous modules use this virtual image.

Image Enhancement System

Figure 3:
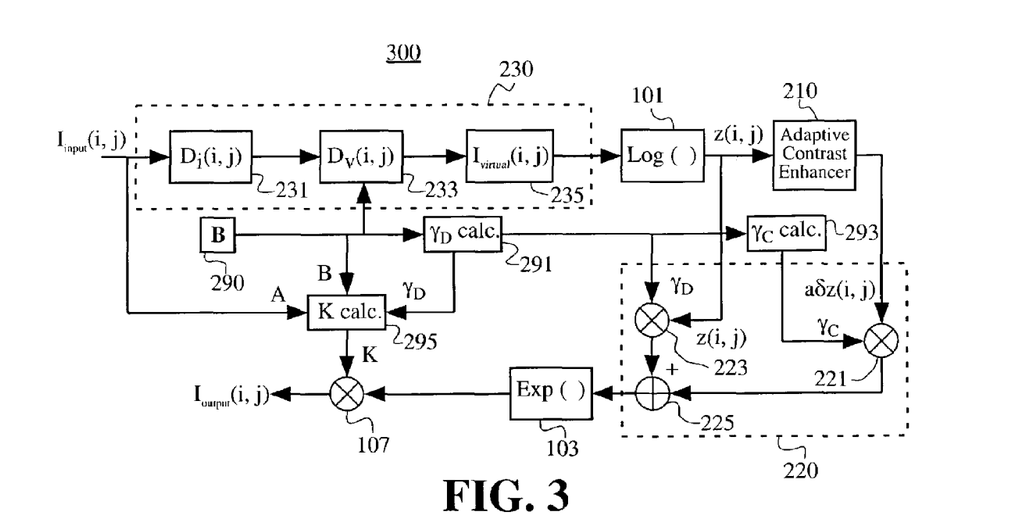
FIG. 3 shows a block diagram of an image enhancement system according to an embodiment of the present invention.

A block diagram of an image enhancement system 300 according to the present invention is shown in FIG. 3. The image enhancement system 300 comprises embodiments of an adaptive contrast enhancer module 210, a dynamic range module 220 and a virtual image generation module 230, as discussed above. The system 300 receives an input image $I_{input}(i,j)$ that is operated on by the virtual image generation module 230 to produce a virtual image $I_{virtual}(i,j)$ The virtual image $I_{virtual}(i,j)$ is then converted to a log image $z(i,j)$ by the logarithmic operator 101. The adaptive contrast enhancer module 210 is used to produce the adaptive contrast $a\delta z(i,j)$. The dynamic range module 220 receives both the log image $z(i,j)$ and the adaptive contrast $a\delta z(i,j)$ to produce a modified log image. The exponential operator 103 then converts the modified log image to a modified image. The multiplier 107 then multiplies the modified image by a scale factor K to produce a compensated image $I_{output}(i,j)$ As discussed above, the virtual image generator module 230 preferably uses the virtual camera parameter B in the calculations for the virtual image. The virtual camera parameter may be provided as a user-specified input 290. The virtual camera parameter B may also be used to calculate the scale factors, $\gamma_C$ and $\gamma_D$, used in the calculations in the dynamic range module 220. Finally, the virtual camera parameter B may also be used in the calculation of the scale factor K used in producing the compensated image $I_{output}(i,j)$ The value of the dynamic range module scale factor YD may be calculated as follows:

$$\gamma_D = \frac{1}{B-X} \quad \text{if } B > X$$
$$= 1 \quad \text{if } B = X$$
(Eq. 16)

where B is the virtual camera parameter and X is the intensity resolution of the device used to capture the image, as discussed above. Equation 16 suggests that the scaling factor for the dynamic range will monotonically decrease with an increase in the bits/pixel value of the virtual image. The scaling factor $\gamma_C$ for the output of the adaptive contrast enhancer 210 can be readily obtained using Equation 10. When the virtual image has the same quality as the input image, then B=X and $\gamma_D$ is set to 1.0. This implies that $\gamma_C$ for the input is zero. This is reasonable because the virtual image has the same bits/pixel as the input image. Hence, the $\gamma_D$ calculation 291 in FIG. 3 may be obtained from Equation 16 and the virtual camera parameter B. The $\gamma_C$ calculation 293 may be obtained from $\gamma_D$ and Equation 10.

The value for K is also obtained using the B parameter as follows:

$$K = (2^Y - 1) * \frac{e^{\frac{B}{A}}}{(I_{virtual}^{max})^{\gamma_D}} \quad \text{where} \quad A = I_{input}^{avg} \quad \text{and} \quad I_{virtual}^{max} = 2^B$$ (Eq. 17)

where A represents the average image intensity for the input image and Y represents the dynamic range (in bits/pixel) of a display device used to display the compensated image. Thus, the K factor helps in scaling the compensated image $I_{output}$ to be within the visible range of the display device so as to visualize the compensation/enhancement as well as use the image for further processing, if necessary. Values below and above the display range are clipped. The final output $I_{output}$ can then be expressed in terms of the three system parameters as follows:

$$I_{output} = K e^{a\delta z * \gamma_C + z * \gamma_D}$$ (Eq. 18)

Using the algorithm described above, image processing systems according to the present invention can achieve a balance between improving the dynamic range of the image while still enhancing the contrast for low contrast regions and retaining the contrast for high contrast regions. The parameters are global and hence need to be set only in the beginning of the computations. As described above, a user need only specify the virtual camera parameter B and all other scale factors may be calculated from that one parameter.

In an alternative embodiment, the parameters may be computed locally for each pixel. Computations of the parameters for each pixel may be performed by calculating the adaptive contrast scale factor $\gamma_C$ based on the dynamic range at each pixel using Equation 7. That is, rather than using a single adaptive contrast scale factor $\gamma_C$ for the entire image, the adaptive contrast scale factor is calculated for each pixel in the image. Using Equation 7, the pixel-wise adaptive contrast scale factor is calculated as follows:

$$\gamma_C(i, j) = \frac{I(i, j)}{z_{min}}$$ (Eq. 19)

Using Equation 10, the appropriate value for $\gamma_D$ at each pixel can be computed as follows:

$$\gamma_D(i,j) = \text{const} - \gamma_C(i,j)$$ (Eq. 20)

For the computation of the constant K in this alternative embodiment, the average intensity A in the pixel local neighborhood is used, instead of the average intensity of the whole image. Preferably, the average intensity A is calculated using a local neighborhood of 3×3 pixels. The advantage of this alternative embodiment is that the parameters are more "optimal," but requires more computations compared to the global approach.

Software Implementation

Embodiments of the present invention may be implemented with software. Presented in the COMPUTER PROGRAM LISTING section of this specification is a program written in the C programming language implementing an embodiment of the present invention. This program loads an image contained in a disk file and displays a compensated image using the "global" image enhancement technique described above. The user provides the virtual camera parameter and the program calculates the other constants necessary for the generation of the virtual image and the compensated image. Distribution and installation of this software (and other software that implements embodiments of the present invention) is generally accomplished using media well-known in the art, such as CDROMs.

Hardware Implementation

Figure 9:
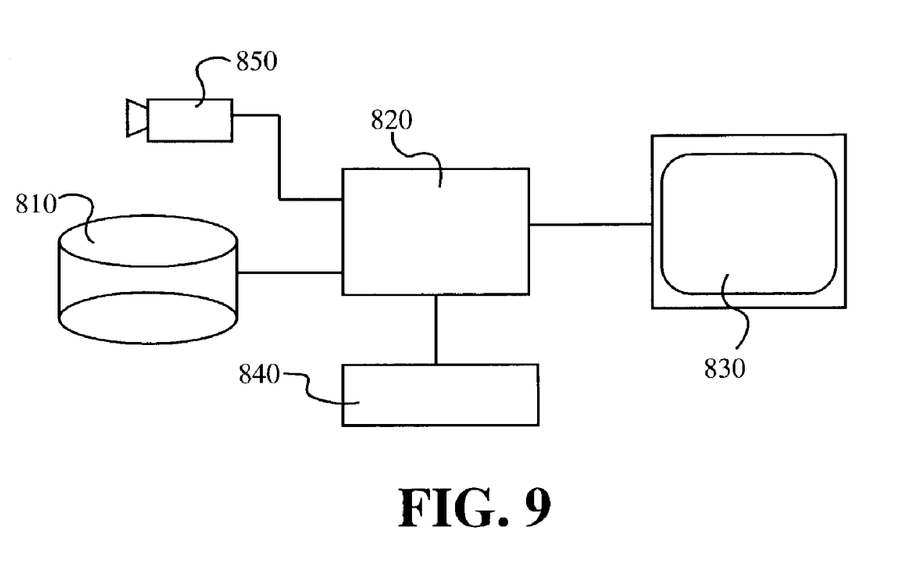
FIG. 9 depicts a hardware block diagram for a computer system according to an embodiment of the present invention.

Embodiments of the present invention may be provided by a computer-based system that executes software designed to implement an embodiment of the method of the present invention. FIG. 9 depicts a typical computer system that may be used in an embodiment of the present invention. Program code and parameter settings may be stored in a storage device 810, such as a disk drive, tape drive, solid state memory, or other storage devices known in the art. The storage device 810 may also store files containing uncompensated images and may be used to store files containing compensated images. Images may also be acquired using an image acquisition device 850, such as a CCD camera. A processor 820, for example, a commercially available processor such as a Pentium® microprocessor from Intel Corporation, is coupled to the image acquisition device 850 to receive the acquired image. The acquired image may be output in a digital form by the acquisition device 850 or the processor 820 may convert an acquired analog image to a digital image. The processor 820 executes the computer-based commands needed to perform the image compensation according to embodiments of the present invention. A user input device 840, such as a keyboard, is used to provide user-specified data and commands to the processor 820. A display device 830, such as a computer monitor, provides a display of the compensated image, or may provide a display of multiple images, such as both the original acquired image and the compensated image.

Results

Figure 4:
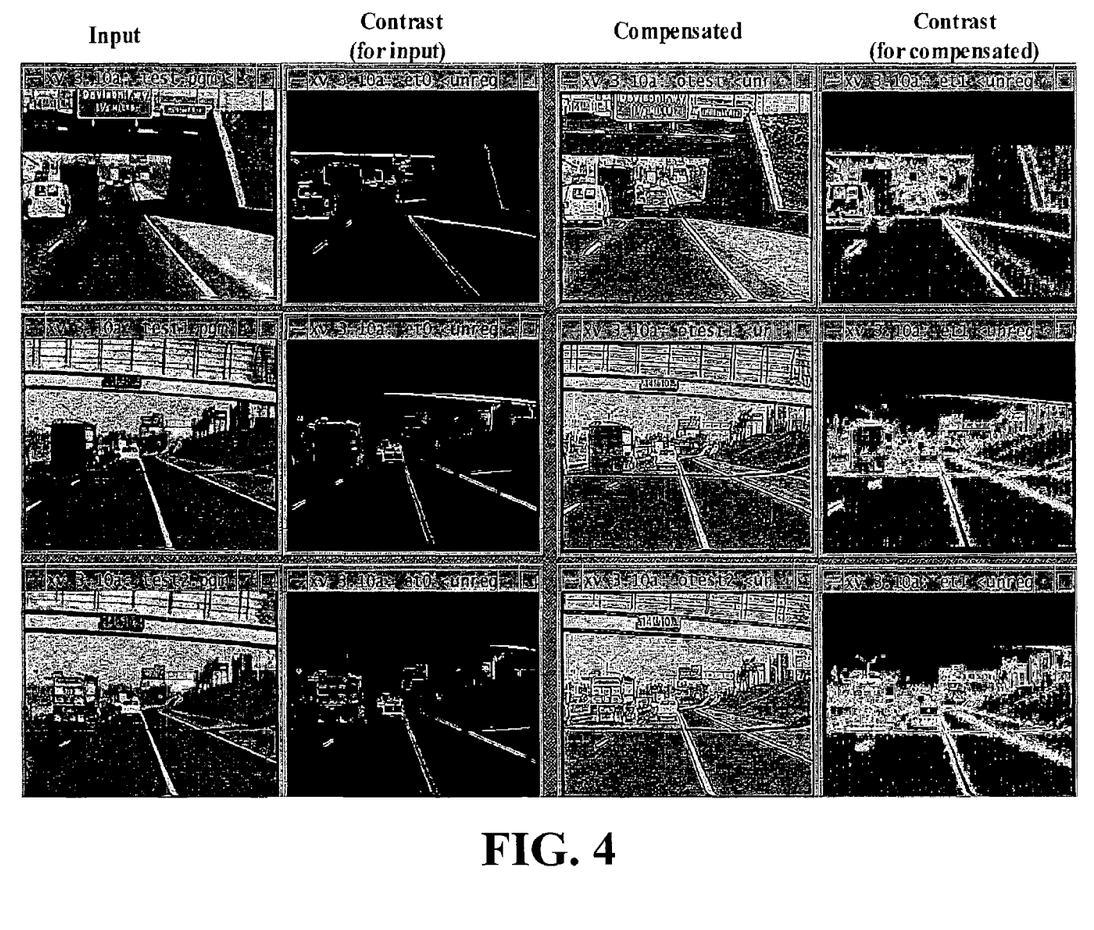
FIG. 4 depicts the enhancement in overall image quality and contrast provided by an embodiment of the present invention by showing three original images and their contrast and three compensated images and their contrast.
Figure 5:
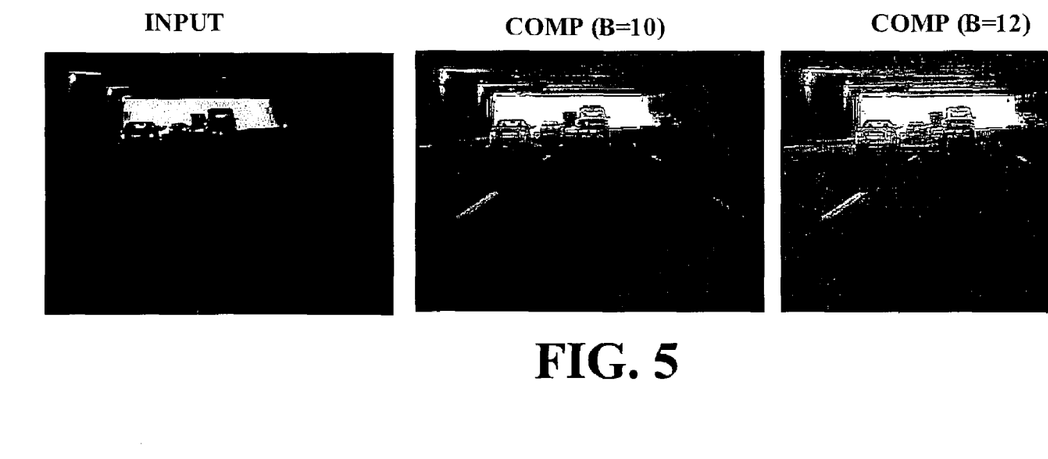
FIG. 5 depicts an original image of vehicles in a tunnel and the effect of specifying different virtual camera parameters with an embodiment of the present invention on the resulting compensated images.
Figure 6:
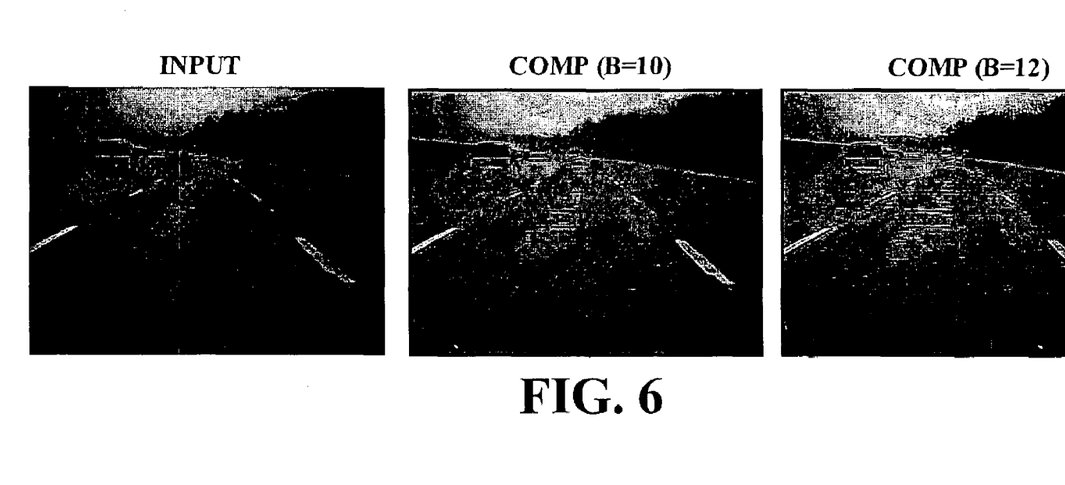
FIG. 6 depicts an original image of vehicles in a rain scene and the effect of specifying different virtual camera parameters with an embodiment of the present invention on the resulting compensated images.

An embodiment of the present invention has been applied to several example images captured using a regular CCD camera under various illumination conditions. The results of applying this embodiment are shown in FIGS. 4, 5, and 6. In FIG. 4, there are three rows of different input images. Each row has four columns. The first pair of columns corresponds to the input image and its corresponding contrast image using the Sobel edge operator known in the art. The next pair of columns corresponds to the compensated image provided by an embodiment of the present invention and the corresponding contrast image using the Sobel edge operator. All these examples use B=10 (and X=8). From FIG. 4, it can be seen that the contrast information in the scene has dramatically improved. Furthermore, the overall dynamic range has also improved.

FIGS. 5 and 6 show the effect of using different B values for two very different illumination conditions. In FIG. 5, the image is of vehicles inside a tunnel. In both these cases, the overall contrast has improved considerably. Also, by increasing the B value, the contrast gets amplified further. So, depending on the application, an appropriate B can be used. A similar improvement can also be observed for images of FIG. 6. In this case, the mist due to rain covers the back of the car and makes it unclear. The results from enhancing the image according to the present invention improves the images considerably.

Figure 7:
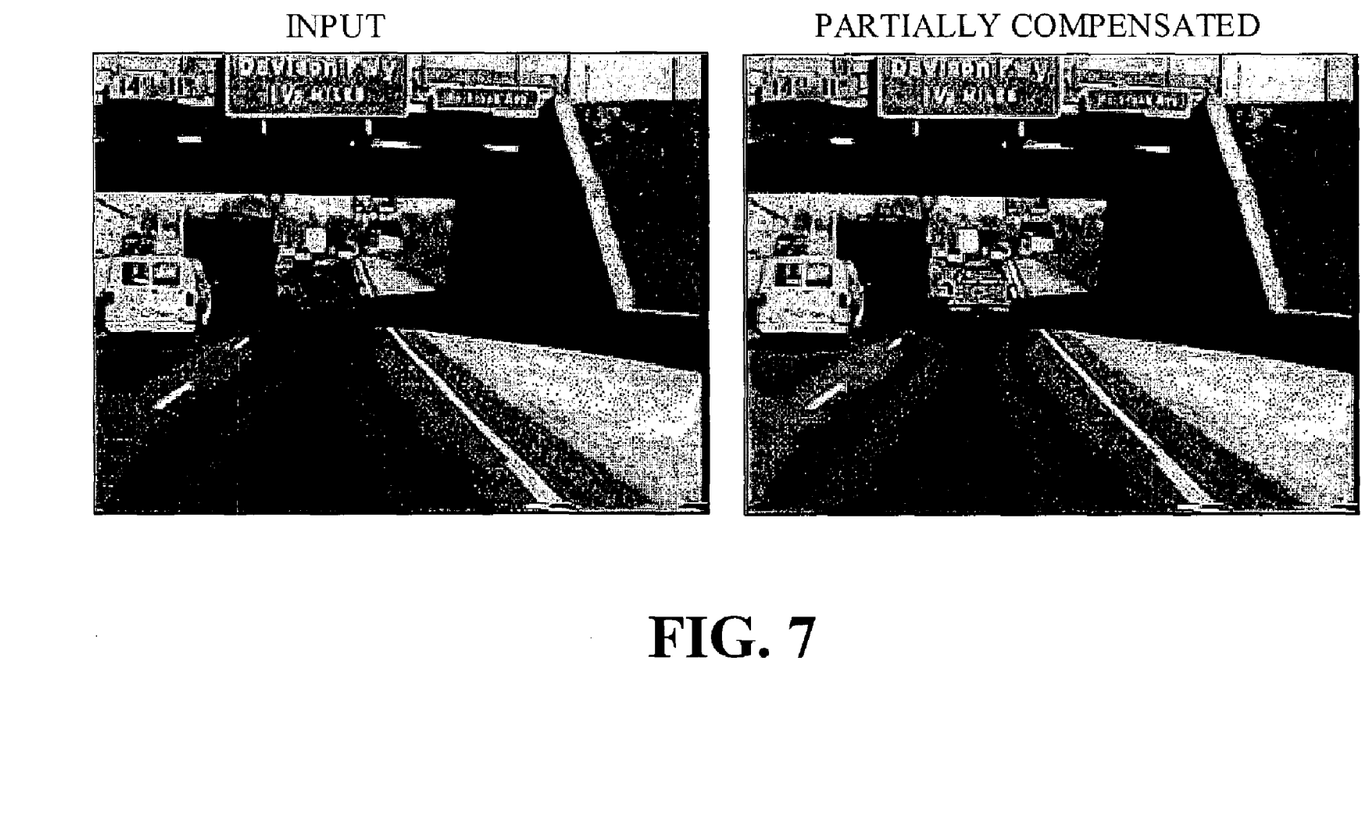
FIG. 7 depicts the effect of compensating only a portion of an image with an embodiment of the present invention.

Another useful aspect of the present invention is that it may be applied for patches of the scene just as easily as the whole image without the need to change any system parameters. This feature is especially desirable if computational speed is very important. By facilitating the processing of small image patches without any change in the overall method used, it is possible for interesting applications in computer vision to be realized, such as robust tracking of the objects under variable illumination. This capability is demonstrated through a vision-based object-tracking example, as shown in FIG. 7. Typically, if a video track is established for a vehicle, such as the small pickup truck shown in FIG. 7, and the pickup truck goes under the bridge (as shown in FIG. 7), then the video track could be lost due to this drastic change in illumination. Embodiments of the present invention address this problem by applying the provided image enhancement selectively within the predicted video track. This enables the features to be tracked in a stable fashion since both the dynamic range and contrast information are improved for the video track. This can be observed by comparing the area around the pickup truck in the input image to the compensated image shown in FIG. 7.

Figure 8:
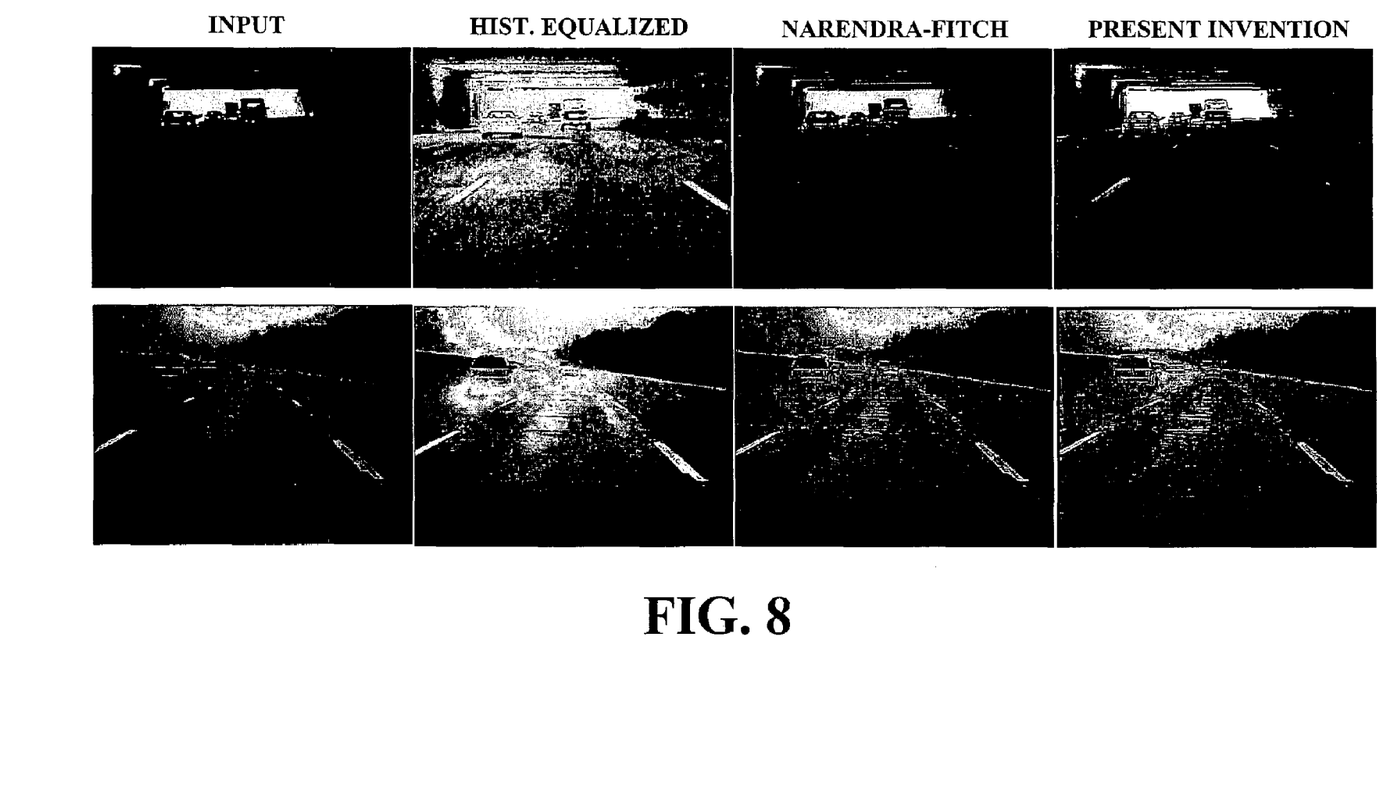
FIG. 8 shows the results obtained for using different compensation techniques known in the art and the results obtained using an embodiment of the present invention on two original images.

Finally, the results obtained using an embodiment of the present invention are compared with other methods for image enhancement. The other methods are histogram equalization as described in Jain, as discussed above, which is an example of the most common algorithm of the first class of algorithms outlined above, and the Narendra-Fitch algorithm as described in the reference authored by P. M. Narenda and R. C. Fitch, discussed above, which is an example of the second class of algorithms outlined above. These two approaches have been selected for comparison because they are the most commonly used methods in their respective class of algorithms and are computationally the most efficient. The first comparison was performed for a tunnel scene with vehicles in front of a host vehicle equipped with an 8-bit/pixel CCD camera. This scene is an extreme situation where the whole image is dark where even details of the lanes near the vehicle are not clearly visible (See FIG. 8, first row, first column). The results of the three approaches are shown in the remaining three columns of the first row. The histogram-equalized image looks quite washed out because of an imbalance between the dynamic range in the image and the contrast enhancement. This is because histogram equalization attenuates pixels with low contrast. For these pixels, neighboring pixels map to the same bin of the histogram and thus result in a loss of small contrasts. The Narendra-Fitch algorithm performs better than the histogram-equalized image in terms of contrast and overall image quality. The image produced by an embodiment of the present invention is superior to both these methods in terms of contrast and dynamic range. A qualitative comparison shows that the image produced the embodiment of the present invention is better than both the other prior art approaches.

The second comparison is for a road scene on a rainy day with vehicles in front of a host vehicle equipped with an 8-bit/pixel CCD camera. This scene is also complicated because of the foggy conditions and the mist that make the vehicles very fuzzy in appearance. Similar to the first example, the histogram equalization method performs an extreme compensation for dynamic range at the expense of contrast information. This can be seen in FIG. 8 (second row and second column). The results for the Narendra-Fitch algorithm and the embodiment of the present invention are better. However, the results obtained using the present invention are still superior to the Narendra-Fitch algorithm in terms of the balance between the dynamic range and contrast information.

From the foregoing description, it will be apparent that the present invention has a number of advantages, some of which have been described above, and others of which are inherent in the embodiments of the invention described above. Also, it will be understood that modifications can be made to the method described above without departing from the teachings of the subject matter described herein. As such, the invention is not to be limited to the described embodiments except as required by the appended claims.

COMPUTER PROGRAM LISTING

Shown below is a computer program listing of a program in the C programming language for implementing an embodiment of the invention. This computer listing is presented to aid in the understanding of the invention. It is understood that the present invention is not limited to the computer program listing presented below. Other embodiments of the present invention may be provided by modifying this code. Still other embodiments of the present invention may be provided by software written in other programming languages. Still other embodiments of the present invention may be provided by computer programs, subroutines, functions, objects, or other software implementations having different structures, variables, memory usage, etc. than that shown below. Finally, as discussed above, embodiments of the present invention may be provided by hardware systems, firmware systems, or a mix of hardware, software, and/or firmware.

```
/* C program for illumination compensation */
/* In this version, all parameters are computed off-line */
/* based on the user-defined bits/pixel parameter */
/* Written by Narayan Srinivasa */
/* Copyright 2002 HRL Laboratories LLC */
#include <stdio.h>
#include <stdlib.h>
#include <math.h>
#include <time.h>
#define NR 240 //image height
#define NC 320 //image width
#define scale 3 // window for extracting statistics
#define OFFSET 5 //all operation offset from the borders
#define H_CONST 0.45 //constant multiplier
#define BASEH 8 //base horizontal threshold value
#define V_CONST 0 //constant multiplier
#define BASEV 6 //base vertical threshold value
#define EDGE_H 40 //horizontal edge filter threshold
#define EDGE_V 40 //vertical edge filter threshold
#define DIFF_H 2 //gradient search distance
#define FOCAL_POINT 60 // set focal point for parameter (distance) estimation
#define HORIZON 60 // set horizon for edge detection, parameter (distance) estimation . . .
// store offsets for statistics computation
int s_x[9]={-1,0,1,-1,0,1,-1,0,1};
int s_y[9]={-1,-1,-1,0,0,0,1,1,1};
/* Display Image */
void display(char *arv,int *im,int cn,int rn)
{FILE *fp;
int j,k;
fp=fopen(arv,"w");
fprintf(fp,"P2\n");
fprintf(fp,"%d %d\n",cn,rn);
fprintf(fp,"%d\n", 255);
  for(j=0;j<rn;j++) {
  for(k=0;k<cn;k++) {
    fprintf(fp,"%d",im[j*cn+k]);}
    fprintf(fp,"\n");}
fclose(fp);
}
// compute the horizontal and vertical edge map
void edge_extract(int *im2, int *res2,int *res3,int *res4,int *vect,float *ma,int *ind)
{
/*
input:
  im2:grayscale image
output:
  res2 contains length filtered horizontal edge
  res3 contains length filtered vertical edge
  res4 contains length filtered combined edge
*/
int i,j,k,p;
int n,wh,wv;
int v_count[NC]={0};
wh=0;
wv=0;
p=0 ;
*ma=-1000.0;
for (j=HORIZON;j<NR-OFFSET-3;j++){
wh=0;
for(k=OFFSET;k<NC-FFSET;k++)
{
i=j*NC +k;
/* Horizontal edge detection. Edge detection occurs when
  the intensity gradient between two vertically aligned
  pixels exceeds some threshold (EDGE_H).
*/
if (abs(im2[i]-im2[i+DIFF_H*NC])>EDGE_H)
{res2[i]=255;
if(abs(im2[i]im2[i+DIFF_H*NC])>EDGE_H+15) {
if(*ma<fabs((float)(im2[i]-im2[i+DIFF_H*NC]))) {
  *ma=fabs((float)(im2[i]-im2[i+DIFF_H*NC]));
  *ind=i;}
res4[i]=255; }
wh++;
}
else if (wh==0)
  {res4[i]=0;
  res2[i]=0;
  }
  else if (wh<BASEH+H_CONST*vect[i])
    {res4[i]=0;
    res2[i]=0;
    for (n=0;n<wh;n++)
    res2[i-n-1]=0;
    wh=0;
    }
    else {
    wh=0;res4[i]=0;
    }
if(k==NC-OFFSET-1)
  {
  if(wh<BASEH+H_CONST*vect[i]) {
  res2[i]=0;
  for (n=0;n<wh;n++)
  res2[i-n-1]=0;
  wh=0;}
  }
/* Vertical edge detection. Edge detection occurs when the
  intensity gradient between two horizontally aligned pixels
  exceeds some threshold (EDGE_V).
*/
if ( abs(im2[i]-im2[i+1]>EDGE_V)
```

```
            {res3[i]=255;
            if(abs(im2[i]−im2[i+1])>EDGE_V+_10) {
               if(*ma<fabs((float)(im2[i]−im2[i+1]))) {
                  *ms=fabs((float)(im2[i]−im2[i+1]));
                  *ind=i;}
               res4[i]=255; }
            v_count[k]=v_count[k]+1;
         }
         else if (v_count[k]==0)
         res3[i]=0;
         else if (v_count[k]<BASEV+V_CONST*vect[i])
            {res3[i]=0;
            for (n=0;n<v_count[k];n++)
            res3[i−(n+1)*NC]=0;
         }
         else {
         v_count[k]=0;}
         if(j==NR−OFFSET−4)
            {if(v_count[k]<BASEV+V_CONST*vect[i])
               {res3[i]=0;
               for (n=0;n<v_count[k];n++)res3[i−(n+1)*NC]=0;
               }
            }
      }/*for(k..*/
   }/*for(j==.*/
}
/* Main routine */
main( )
{
   int i,j,k,kindex[9];
   int i1,j1,k1, ind,cnt;
   float imax,imin,Dr,pa,vn,Dd,1dmax;
   float gamma_c,gamma_d,ksup,ymin,ymax;
   float almean,aldz,val1,val2,ma,max;
   int nc1,nr1,M,num,N;
   int *im,*im1;
   int *res,*res1,*ms,*vect;
   unsigned char imr[NR*NC];
   unsigned char ch[20];
   clock_t tbeg,tend,tbeg1,tend1;
   double valt,valt1;
   float mean,std,val,cs,value,*z;
   float fac,bits,pmax,xmax,zmax,C,xval;
   float mistd,mastd,mmin,mmax,lambda;
   FILE *fp,*fp1;
/* Load image file in binary format */
//fp=fopen("L0409I696W4_0958.pgm","r");
   fp=fopen("L0409I696W2_1437.pgm","r");
   fscanf(fp,"%s",ch);
   fscanf(fp,"%d%d",&nc1,&nr1);
   fscanf(fp,"%d",&num);
   fread(imr,sizeof(unsigned char),nc1*nr1,fp);
   fclose(fp);
N=nr1*nc1;
im=(int *) calloc(N,sizeof(int));
im1=(int *) calloc(N,sizeof(int));
z=(float *) calloc(N,sizeof(float));
// edge map arrays
res=(int *) calloc(N,sizeof(int));
res1=(int *) calloc(N,sizeof(int));
ms=(int *) calloc(N,sizeof(int));
//length filter vector
vect=(int *) calloc(N,sizeof(int));
/* compute the vect values for edge extraction */
for (j=0;j<NR;j++)
for (i=0;i<NC;i++)
   vect[i+j*NC]=((j−FOCAL_POINT)*(j−FO-
      CAL_POINT)+(i−NC/2)*(i−NC/2))/500;
printf("Input the total number of bits/pixel in camera:");
scanf("%f",&bits);
printf("\n");
/* compute the various parameters for the illumination
   compensation */
xmax=pow(2.0,bits);
lambda=bits-8;
if(bits==8)lambda=1.0;
gamma_d=1.0/lambda;
C=4.0−0.25*(lambda-3);
if(C<0) C=1.0;
gamma_c=C−gamma_d;
vn=12.0;
ksup=255.0/pow(xmax,8.0*gamma_d/bits);
tbeg=clock( );
// compute the log image"z"based on the user selected
// bits/pixel choice
xval=log(xmax);
for(i=0;i<N;i++)
{im[i]=(int) imr[i];
   Dr=255.0/im[i];
   Dd=pow(Dr,lambda);
   z[i]=xval−log(Dd);
}
/* Get edge map and the pixel (ind) with the highest contrast
   and the contrast value (ma) */
edge_extract(im,res,res1,ms,vect,&ma,&ind);
display("eh0",res,nc1,nr1);
display("ev0",res1,nc1,nr1);
display("et0",ms,nc1.mr1);
// compute local statistics and estimate compensated illumi-
   nation
value=scale*scale;
for(k=0;k<N;k++)
{
   i=(int) (k/nc1);
   j=k−i*nc1;
// for all pixels within the image−scale offsets from each side
// to avoid the border effect
if((i>=scale) && (i<nr1-scale) && (j>=scale) && (j<nc1-
   scale))
{
// compute local mean
   mean=0.0;
   for(i1=0;i1<(int) value;i1++)
      {kindex[i1]=(i+s_x[i1])*nc1+(j+s_y[i1]);
         mean+=z[kindex[i1]];
      }
   mean/=value;
// compute local standard deviation
   std=0.0;
   for(i1=0;i1<(int)value;i1++)
   {val=z[kindex[i1]]−mean;
      std+=val*val;
   }
   std /=value;
// apply the gamma_c and gamma_d based correction to z
   if(std−vn<0.0)
      val2=(z[k]−mean)*gamma_c+gamma_d*z[k];
      else {pa=(std-vn)/std;
      almean=mean+pa*(z[k]−mean);
      aldz=z[k]−almean;
      val2=aldz*gamma_c +gamma_d*z[k];}
// compute compensated image intensity by reverting
// back to normal from the log domain
```

```
    im1[k]=(int)(ksup*exp(va12));
// clip any excess intensity outside the display range
    if(im1[k]>255) im1[k]=255;
    if(im1[k]<0)im1[k]=0;
    }//of(i>. . .
}// for(k=. .
tend=clock( );
valt=(double)(tend-tbeg)/CLOCKS_PER_SEC;
printf("Time=%1fsecs\n",valt);
display("B1=12",im1,nc1,nr1);
edge_extract(im1,res,res2,ms,vect,&ma,&ind);
display("eh1",res,nc1,nr1);
display("ev1",res1,nc1,nr1);
display("et1",ms,nc1,nr1);
free((int *)im);
free((int *)im1);
free((char *)res);
free((char *)z);
free((char *)res1);
free((char *)ms);
free((char *)vect);
}
```

What is claimed is:

1. A method for image enhancement comprising the steps of:
    receiving a digital image of a scene, the digital image comprising a plurality of digital image pixels;
    generating a virtual image of at least a portion of the digital image pixels, the virtual image having a plurality of virtual pixels, each virtual pixel having a pixel intensity;
    logarithmically converting the pixel intensities of at least a portion of the virtual pixels to produce a plurality of log virtual pixels;
    performing adaptive contrast enhancement on at least a portion of the log virtual pixels to produce a plurality of adaptive contrast values corresponding to said at least a portion of log virtual pixels;
    performing dynamic range adjustment using said at least a portion of the log virtual pixels and said plurality of adaptive contrast values to produce a plurality of log enhanced pixels; and
    exponentially converting at least a portion of the log enhanced pixels to produce a plurality of enhanced pixels, the plurality of enhanced pixels comprising an enhanced digital image.

2. The method of claim 1, said method further comprising the step of specifying a virtual camera parameter, wherein the pixel intensities of said virtual pixels are based on said virtual camera parameter.

3. The method of claim 2, wherein the step of generating a virtual image comprises adjusting a pixel intensity of each pixel of the at least a portion of the digital image pixels to produce the plurality of virtual pixels.

4. The method of claim 3, wherein the pixel intensities of the at least a portion of the digital image pixels are represented by $I_{input}(i,j)$, the pixel intensities of the virtual pixels of the plurality of virtual pixels are represented by $I_{virtual}(i,j)$, the virtual camera parameter has a value of B bits/pixel, the digital image pixels have an intensity resolution of X bits/pixel and the pixel intensities of the virtual pixels are calculated using the following equation:

$$I_{virtual}(i,j) = 2^{(B-X(B-X)\frac{X}{B})} I_{input}(i,j)^{\frac{X}{B}(B-X)}.$$

5. The method of claim 1, wherein the step of performing adaptive contrast enhancement comprises the steps of:
    calculating a corresponding adaptive scale parameter value for each log virtual pixel;
    calculating a corresponding local mean value for each log virtual pixel;
    calculating a corresponding adaptive local mean value for each log virtual pixel based on the corresponding adaptive scale parameter and the corresponding local mean value for the log virtual pixel; and,
    calculating a corresponding adaptive contrast value for each log virtual pixel based on the corresponding adaptive local mean value and the intensity of the log virtual pixel to produce the plurality of adaptive contrast values.

6. The method of claim 5, wherein the step of calculating a corresponding adaptive scale parameter comprises the steps of:
    calculating a corresponding variance value for each log virtual pixel;
    calculating a corresponding rectified variance value for each log virtual pixel, wherein the corresponding rectified variance value equals the maximum of zero and the result of a specified constant subtracted from the corresponding variance value, said specified constant being greater than zero; and,
    calculating the corresponding adaptive scale parameter for said each log virtual pixel by dividing the corresponding rectified variance value by the corresponding variance value.

7. The method of claim 6, wherein the corresponding variance value for said each log virtual pixel comprises the square of the result of an intensity value of said each log virtual pixel minus a mean intensity of the log virtual pixels within a local neighborhood of said each log virtual pixel.

8. The method of claim 7, wherein said local neighborhood comprises a window of 3 pixels by 3 pixels centered on said each log virtual pixel.

9. The method of claim 1, wherein each adaptive contrast value is represented by $a\delta z(i,j)$ and each log virtual pixel is represented by $z(i,j)$ and each adaptive contrast value is calculated using the following equation:

$$a\delta z(i,j) = z(i,j) - [(1-\pi(i,j))z_{mean}(i,j) + \pi(i,j)z(i,j)]$$

wherein $z_{mean}(i,j)$ represents the mean intensity within a local neighborhood of each log virtual pixel and $\pi(i,j)$ represents an adaptive scale parameter for each log virtual pixel, said adaptive scale factor being calculated using the following equation:

$$\pi(i,j) = \frac{[v(i,j) - C]^+}{v(i,j)}$$

wherein $v(i,j)$ is the variance at each log virtual pixel and C is a specified constant.

10. The method of claim 9, wherein said local neighborhood comprises a window of 3 pixels by 3 pixels centered on said each log virtual pixel.

11. The method of claim 1, wherein each adaptive contrast value is zero or close to zero when the corresponding log virtual pixel is in a region of high contrast and each adaptive contrast value is equal to or nearly equal to the contrast of the corresponding log virtual pixel when the log virtual pixel is in a region of low contrast.

12. The method of claim 1, wherein the step of performing dynamic range adjustment comprises performing a scaling operation on each log virtual pixel.

13. The method of claim 12, wherein performing the scaling operation on each log virtual pixel comprises the steps of:
multiplying each log virtual pixel by a dynamic range scale factor to produce a scaled log virtual pixel corresponding to each log virtual pixel;
multiplying each adaptive contrast value by an adaptive contrast scale factor to produce a scaled adaptive contrast value corresponding to each log virtual pixel; and
adding each scaled log virtual pixel to each scaled adaptive contrast value corresponding to each log virtual pixel to produce the plurality of log enhanced pixels,
wherein the dynamic range scale factor added to the adaptive contrast scale factor scale factor equals a specified constant.

14. The method of claim 13, wherein a corresponding adaptive contrast scale factor is calculated for each log virtual pixel based on the dynamic range for a corresponding digital image pixel.

15. The method of claim 14, wherein the corresponding adaptive contrast scale factor for each log virtual pixel equals the pixel intensity of the corresponding digital image pixel divided by a minimum pixel intensity in a portion of the digital image containing the corresponding digital image pixel.

16. The method of claim 13, said method further comprising the step of specifying a virtual camera parameter of B bits/pixel, and wherein the digital image pixels have a resolution of X bits/pixel, said specified constant has a value of 1, and said dynamic range scale factor is equal to the inverse of the value of B minus X, if B is greater than X.

17. The method of claim 1, said method further comprising multiplying each enhanced pixel by a compensation scale factor to provide that the enhanced digital image is within a visible range of a selected display device.

18. The method of claim 2, said method further comprising multiplying each enhanced pixel by a compensation scale factor K, said compensation scale factor K calculated from the following equation:

$$K = (2^Y - 1) * \frac{e^{\frac{B}{A}}}{(2^B)^{\gamma_D}}$$

wherein Y represents a dynamic range in bits/pixel of a specified display device used to display said enhanced digital image, A represents an average intensity in bits/pixel of the at least a portion of the digital image pixels, B represents the value of the virtual camera parameter in bits/pixel, and $\gamma_D$ represents a dynamic range scale factor.

19. A computer-readable medium having computer-executable instructions for performing the method according to claim 1.

20. A computer system using computer-executed instructions for performing the method of claim 1, the system comprising:

a processor for executing the computer-executed instructions;
a digital image acquisition device for acquiring the digital image;
a display device coupled to said processor;
a user input device coupled to said processor, said user input device transferring user commands to said processor; and
a storage device coupled to said processor.

21. An apparatus for producing an enhanced image from a digital image having a plurality of digital image pixels, the apparatus comprising:
means for expanding a dynamic range of at least a portion of the digital image pixels to produce a virtual image comprising a plurality of virtual pixels;
means for calculating a corresponding adaptive contrast value for a corresponding virtual pixel of the plurality of virtual pixels, said means for calculating receiving said plurality of virtual pixels and producing a plurality of adaptive contrast values;
means for adjusting an intensity of a corresponding virtual pixel of said plurality of virtual pixels, said means for adjusting receiving said plurality of adaptive contrast values and said plurality of virtual pixels and producing a plurality of enhanced pixels; and,
means for scaling said plurality of enhanced pixels to produce said enhanced image.

22. The apparatus of claim 21, wherein said apparatus further comprises a means for specifying a virtual camera parameter and said means for expanding a dynamic range of at least a portion of the digital image pixels adjusts a pixel intensity of each virtual pixel based on the virtual camera parameter.

23. The apparatus of claim 21, wherein said means for calculating a corresponding adaptive contrast value produces the corresponding adaptive contrast value for each corresponding virtual pixel such that the adaptive contrast value is zero or close to zero when the corresponding virtual pixel is in a region of high contrast and the adaptive contrast value is equal to or nearly equal to the contrast of the corresponding virtual pixel when the virtual pixel is in a region of low contrast.

24. The apparatus of claim 21, wherein said means for adjusting an intensity of each virtual pixel produces a corresponding enhanced pixel of said plurality of enhanced pixels based on the product of multiplying the corresponding virtual pixel by a first scale factor added to the product of multiplying the corresponding adaptive contrast value by a second scale factor.

25. The apparatus of claim 21, wherein said means for scaling scales said plurality of enhanced pixels for display within a visible range of a selected display device.

26. A method for enhancing the contrast of a digital image wherein said digital image comprises an array of digital pixels, each digital pixel having a dynamic range, said method comprising the steps of:
specifying a virtual camera parameter;
generating an array of virtual pixels from said array of digital pixels, each virtual pixel having an expanded dynamic range based on said virtual camera parameter;
logarithmically converting said array of virtual pixels to an array of log virtual pixels;
generating an array of adaptive contrast values corresponding to said array of log virtual pixels;

generating an array of log enhanced pixels from said log virtual pixels and from said array of adaptive contrast values;

exponentially converting said array of log enhanced pixels to an array of enhanced pixels, each enhanced pixel having an intensity; and scaling the intensity of each enhanced pixel to be within a specified range for an image output device.

27. The method of claim 26, wherein said virtual camera parameter comprises a specified intensity resolution in bits/pixel of said virtual pixels, said specified intensity resolution being greater than an intensity resolution of said array of digital pixels.

* * * * *